United States Patent
Roth et al.

(10) Patent No.: US 10,800,311 B2
(45) Date of Patent: Oct. 13, 2020

(54) RAMP DOOR OPERATING MECHANISM

(71) Applicant: Lippert Components, Inc., Elkhart, IN (US)

(72) Inventors: Bryan J. Roth, Topeka, IN (US);
Jeffrey K. Albrecht, Goshen, IN (US);
Dominick Bilancio, Elkhart, IN (US);
David G. Skinner, Elkhart, IN (US);
Samuel Evans, Granger, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 121 days.

(21) Appl. No.: 16/276,946

(22) Filed: Feb. 15, 2019

(65) Prior Publication Data
US 2019/0248268 A1   Aug. 15, 2019

Related U.S. Application Data

(60) Provisional application No. 62/631,233, filed on Feb. 15, 2018.

(51) Int. Cl.
*B60N 2/00* (2006.01)
*B60P 1/43* (2006.01)

(52) U.S. Cl.
CPC ............ *B60P 1/436* (2013.01); *B60P 1/435* (2013.01)

(58) Field of Classification Search
CPC ...... B60P 1/435; B60P 1/43; Y10T 292/1047; A61G 3/061; A61G 3/067; E05Y 2900/132; E05Y 2900/20; Y10S 414/134
See application file for complete search history.

(56) References Cited

U.S. PATENT DOCUMENTS

| | | | | |
|---|---|---|---|---|
| 3,795,329 A | * | 3/1974 | Martin | B60P 1/4421 |
| | | | | 414/545 |
| 3,872,983 A | * | 3/1975 | Chapman | B60P 3/07 |
| | | | | 410/6 |
| 3,874,527 A | * | 4/1975 | Royce | A61G 3/061 |
| | | | | 414/537 |
| 3,892,088 A | * | 7/1975 | Fleenor | B60P 1/003 |
| | | | | 49/37 |
| 4,088,288 A | | 5/1978 | Barnes | |
| 4,097,009 A | | 6/1978 | Barnes | |
| 4,771,305 A | * | 9/1988 | Potoroka | G03B 15/06 |
| | | | | 296/24.39 |
| 4,966,510 A | * | 10/1990 | Johnson, Jr. | B60P 3/08 |
| | | | | 410/24 |
| 5,391,041 A | | 2/1995 | Stanbury et al. | |
| 5,768,828 A | * | 6/1998 | Wilson | B60P 1/438 |
| | | | | 49/197 |
| 6,343,908 B1 | | 2/2002 | Oudsten et al. | |
| 7,070,176 B1 | * | 7/2006 | Rios | B60J 5/108 |
| | | | | 267/179 |
| 7,347,476 B2 | | 3/2008 | Luehr et al. | |
| 7,419,204 B2 | | 9/2008 | Coble et al. | |

(Continued)

*Primary Examiner* — Kiran B Patel
(74) *Attorney, Agent, or Firm* — Nixon & Vanderhye P.C.

(57) ABSTRACT

An operating mechanism for a ramp door includes a door actuation system and a limit stop system. The actuation system is connected between the door and a frame or the vehicular structure directly and is operable to pivot the door between closed, deck, and ramp positions. The limit stop system selectively limits the pivoting of the door to a range between the closed and deck portion or to a range between the closed and ramp positions.

18 Claims, 14 Drawing Sheets

(56) References Cited

U.S. PATENT DOCUMENTS

| | | |
|---|---|---|
| 7,669,797 B2 | 3/2010 | Yada et al. |
| 9,416,545 B1 | 8/2016 | Nelson |
| 10,279,724 B2 | 5/2019 | Roth et al. |
| 2006/0022481 A1* | 2/2006 | Hunter ................... B60P 1/435 296/57.1 |
| 2006/0220410 A1* | 10/2006 | Luehr ..................... B62D 33/03 296/61 |
| 2007/0040405 A1* | 2/2007 | Coble ..................... B60P 1/435 296/61 |
| 2007/0262107 A1* | 11/2007 | Brenneman ............. E05F 1/123 224/495 |
| 2009/0079217 A1* | 3/2009 | Bakshi ................... B60P 1/435 296/61 |
| 2010/0123330 A1* | 5/2010 | Watts ..................... B60P 1/435 296/61 |
| 2010/0237653 A1* | 9/2010 | Rydberg ................. B60J 5/108 296/182.1 |
| 2016/0096465 A1* | 4/2016 | Kauffman ................ B60P 3/36 296/162 |
| 2018/0022262 A1* | 1/2018 | Roth ...................... E04F 15/02 296/162 |
| 2018/0056845 A1* | 3/2018 | Ousley ..................... B60P 3/34 |
| 2018/0334208 A1* | 11/2018 | Caster ...................... B60P 1/43 |
| 2019/0257137 A1* | 8/2019 | Martens .............. E04B 1/34336 |
| 2019/0270364 A1* | 9/2019 | Roth ...................... B60P 1/435 |
| 2020/0003001 A1* | 1/2020 | Martens .............. E05D 13/1253 |

* cited by examiner

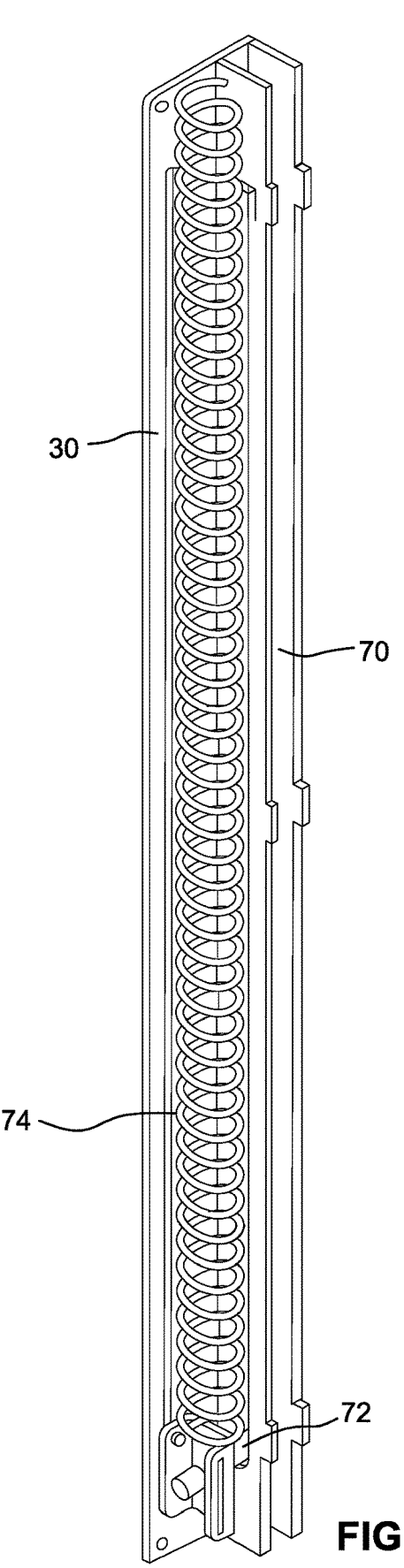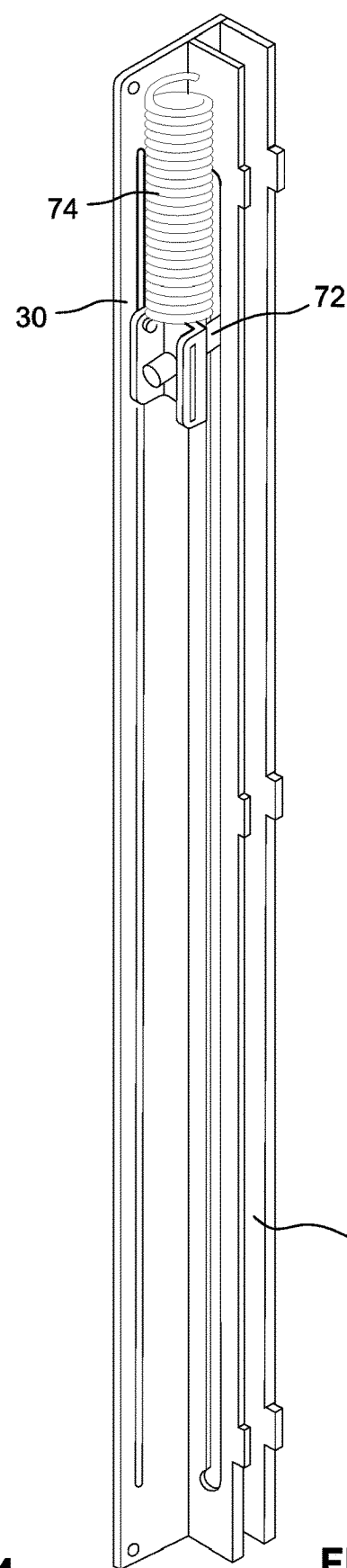
FIG. 14  FIG. 15

RAMP DOOR OPERATING MECHANISM

CROSS-REFERENCES TO RELATED APPLICATIONS

This application claims the benefit of U.S. Provisional Patent Application No. 62/631,233, filed Feb. 15, 2018, the entire content of which is herein incorporated by reference.

STATEMENT REGARDING FEDERALLY SPONSORED RESEARCH OR DEVELOPMENT (Not Applicable)

BACKGROUND

The present invention relates to a ramp door for a vehicular structure and, more particularly, to a ramp door operating mechanism that facilitates positioning of the ramp door among a closed position, a deck position, and a ramp position.

It is known to provide a ramp door for a vehicular structure, for example, a recreational vehicle or trailer, with a ramp door that can be pivoted between a closed position, a deck position, and a ramp position. Such a ramp door may be suspended in the second (deck) position by one or more support cables extending between the ramp door and an upper portion of the vehicle. In order for the door to be lowered to the third position (i.e., the ramp position), a user typically must first disconnect the support cable(s) from the vehicle or the ramp door. This is both inconvenient and potentially dangerous.

BRIEF SUMMARY

It would be desirable to provide a ramp door that could be pivoted between a closed position, a deck position, and a ramp position without requiring a user to disconnect any support cables. In some embodiments, a cam or lever connected to the door tether is selectively releasable manually or by a solenoid to enable the ramp door to further pivot from the deck position to the ramp position without requiring the tether to be disconnected from the door. In some embodiments, a slider assembly is selectively releasable for displacement in a track to similarly enable the ramp door to further pivot from the deck position to the ramp position.

In an exemplary embodiment, a ramp door operating mechanism controls displacement of a ramp door among a closed position, a deck position, and a ramp position. The ramp door operating mechanism includes a door actuation system connectable between the ramp door and a structure. The door actuation system includes a motorized sprocket and a first tether attachable to the ramp door and engaging the motorized sprocket. A door limit stop system is connectable between the ramp door and the structure. The door limit stop system includes a second tether connectable at a proximal end to the structure and at a distal end to the ramp door. The second tether is displaceable between a first position with an effective length to support the ramp door in the deck position and a second position with an effective length to support the ramp door in the ramp position. The door limit stop system additionally includes a tether extender that is configured to lock the second tether in the first position and to selectively release the second tether for displacement to the second position.

In some embodiments, the tether extender may include a lever pivotally connectable to the structure and displaceable between a retracted position and an extended position, corresponding to the first position and the second position of the second tether, respectively. The proximal end of the second tether may be fixed to a distal end of the lever. The tether extender may also include a latch that is connectable to the structure. The lever may be selectively lockable in the retracted position by the latch. The tether extender may additionally include a biasing member, such as a coil spring, acting on the lever, where the biasing member is configured to urge the lever toward the retracted position. The latch may be electrically operated. The latch may be configured to automatically lock the lever in the retracted position when the lever is displaced from the extended position to the retracted position.

In some embodiments, the tether extender may include a track connectable to the structure and a slider displaceable in the track between a retracted position and an extended position. In this context, the second tether is fixed to the slider, and the slider may be lockable in the retracted position. The tether extender may additionally include a keyway adjacent the track, where the slider may include a locking collar that is sized to fit through the keyway but not into the track and a sliding surface that is sized to fit into the track. The slider is displaceable laterally relative to the track between a lock position and a release position. In the lock position, the locking collar may be positioned in the keyway and displacement of the slider in the track may be prevented, and in the release position, the sliding surface may be disposed in the track and the locking collar may be spaced from the keyway such that displacement of the slider in the track is permitted. The slider may be displaceable between the lock position and the release position by a solenoid actuator. The slider may additionally include a limit stop that is positioned to limit lateral displacement of the slider. The tether extender may additionally include a slider biasing mechanism acting on the slider and biasing the slider toward the retracted position.

In another exemplary embodiment, a ramp door assembly for a vehicular structure includes a ramp door and the ramp door operating mechanism of the described embodiments.

BRIEF DESCRIPTION OF THE DRAWINGS

These and other aspects and advantages will be described in detail with reference to the accompanying drawings, in which:

FIG. 14 is a perspective view of a portion of an alternative ramp door operating mechanism according to the present disclosure; and FIG. 15 is another perspective view of the portion of the alternative ramp door operating mechanism of FIG. 14.

DETAILED DESCRIPTION

Figure 1:
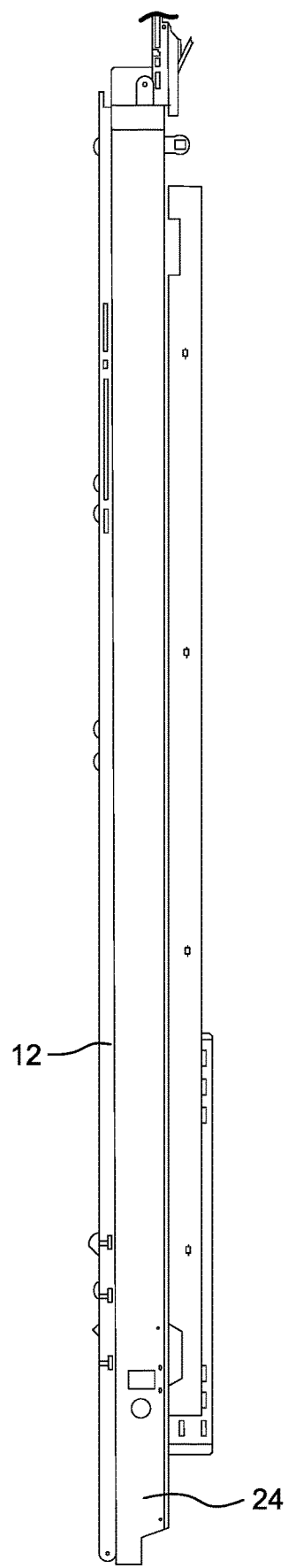
FIG. 1 is a side elevation view of a ramp door and ramp door operating mechanism with the ramp door in a closed configuration according to the present disclosure.

The drawings show illustrative embodiments of a mechanism 10 for operating a ramp door 12 pivotally connected to or otherwise pivotally associated with a structure 14. In an embodiment, the structure 14 may be a vehicular structure, for example, a recreational vehicle or trailer. The structure 14 includes an exterior wall 16 defining an opening 18, and a floor 20. The door 12 defines a load surface 22. The door 12 is pivotally connected to or associated with the structure 14 so that the door may be pivoted between a first position in which the door covers or occupies the opening 18, a second position in which the door load surface 22 is substantially parallel to the floor 20, and a third position pivotally further from the first position than the second position. When in the third position, the door 12 may provide contiguous access between the floor 20 and the ground G upon which the structure 14 may be situated.

The mechanism 10 includes a frame 24, a door actuation system 26, and a door limit stop system 28. The frame 24 is configured to be disposed within or about the opening 18 and connected to the structure 14. The frame 24 may include a first (or left) jamb 30, a second (or right) jamb 32, and a header 34 connecting the first and second jambs proximate respective first (or upper) ends thereof. The first and second jambs 30, 32 may be tubular or hollow, that is, they may include one or more side walls cooperating to define an interior space.

The door actuation system 26 includes a first biasing member 36 connected to the frame 24 and a first tether 38 connected to the first biasing member. As shown, the first biasing member 36 may be embodied as a tension spring having a first end and a second end. The first biasing member 36 may be disposed within the interior space of the first jamb 30. The first end of the first biasing member 36 may be connected to the first jamb 30 proximate a second (or lower) end thereof.

Figure 2:
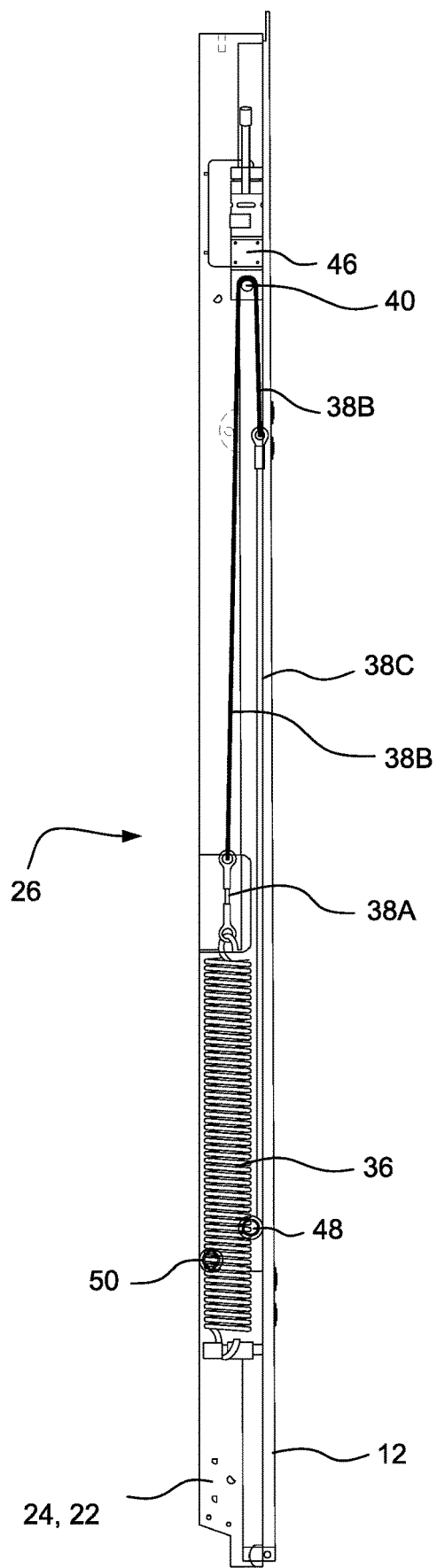
FIG. 2 is a side cross-sectional view of the ramp door operating mechanism as shown in FIG. 1.
Figure 3:
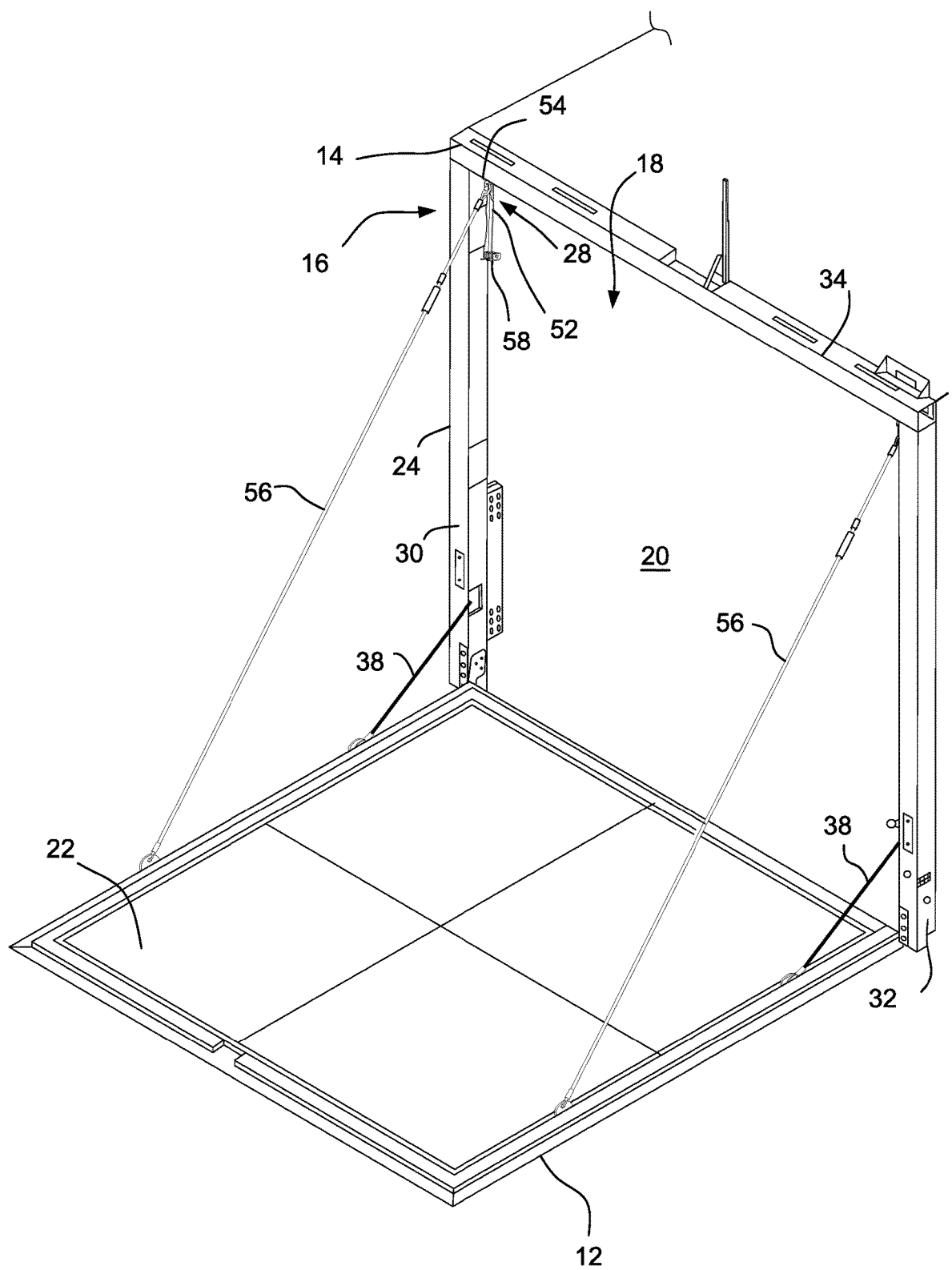
FIG. 3 is a perspective view of a ramp door and ramp door operating mechanism of FIG. 1 with the ramp door in a deck configuration.
Figure 4:
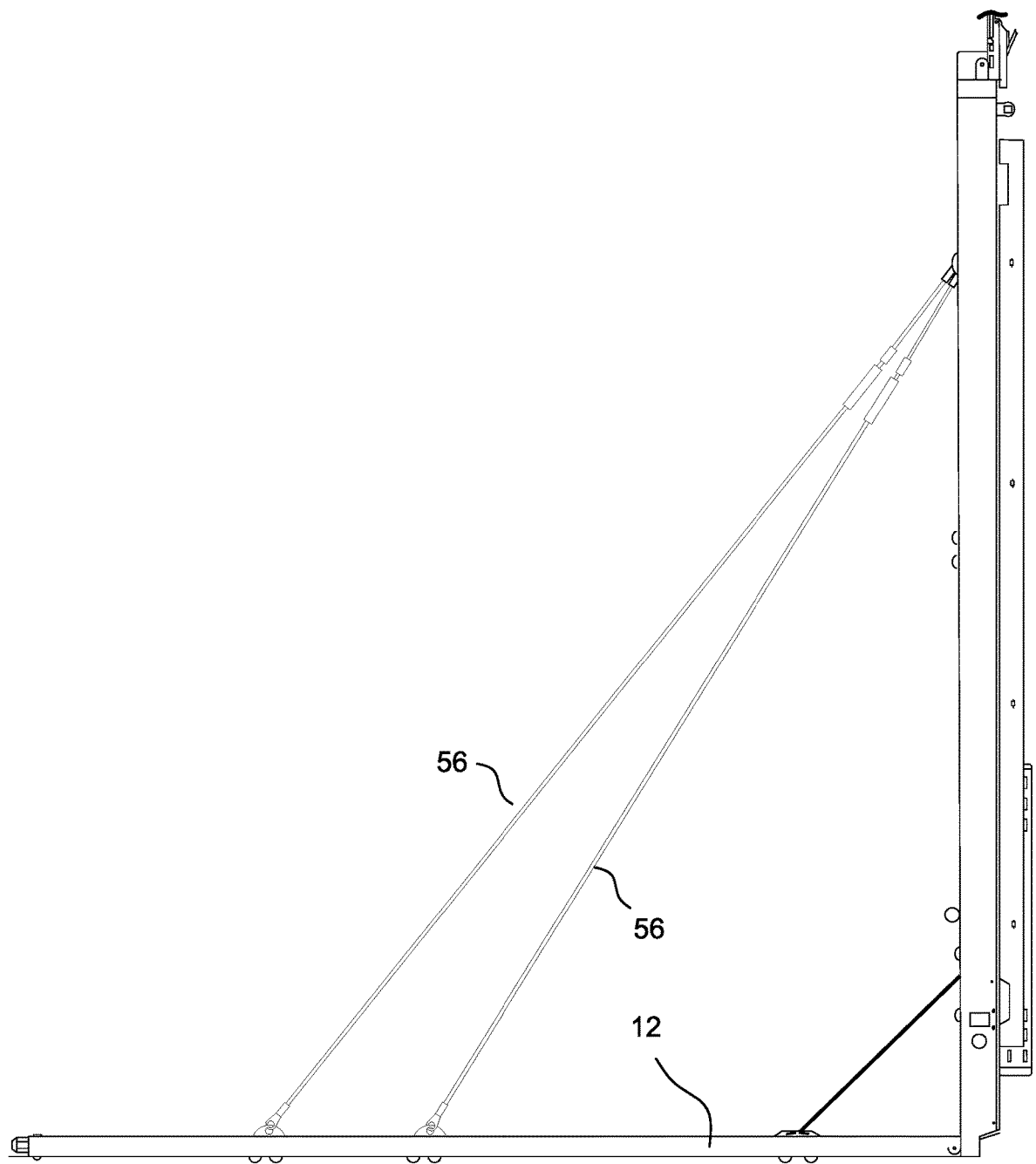
FIG. 4 is a side view of the ramp door and ramp door operating mechanism as shown in FIG. 3.
Figure 5:
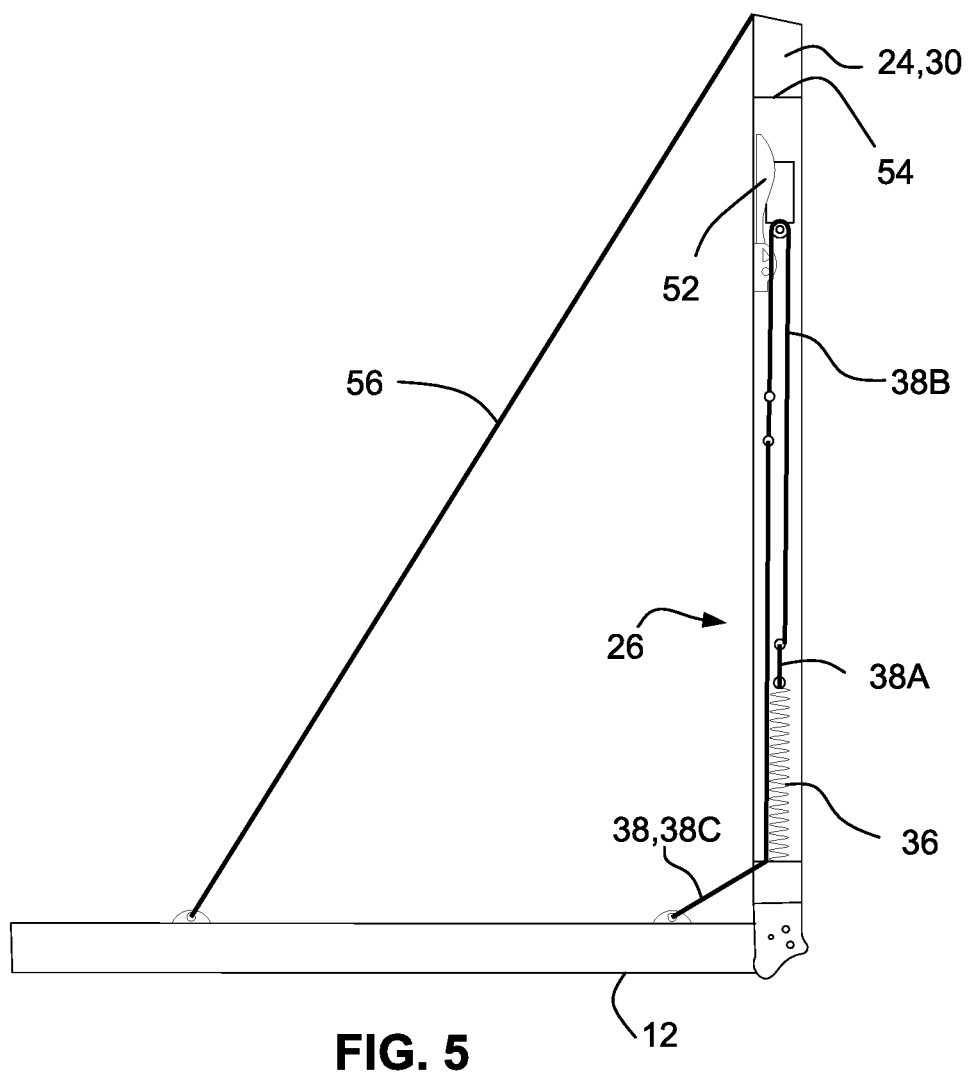
FIG. 5 is a side cross-sectional view of the ramp door and ramp door operating mechanism as shown in FIG. 3.

The first tether 38 is connected at a first end thereof to the second end of the first biasing member 36. The first tether 38 is connected at a second end thereof to the door 12. As shown in FIG. 2, the first tether 38 may be embodied in three sections. The first section 38A, connected to the first biasing member 36, is a first length of cable. The third section 38C, connected to the door 12, is a second length of cable. The second section 38B, intermediate and connected to the first section 38A and the third section 38C, is a length of chain. In other embodiments, any of the first, second, and third sections 38A, 38B, 38C could be embodied as other structures. For example, at least the second section 38B could be embodied as a toothed belt. In further embodiments, the first tether 38 may be embodied in one, two, or more than three sections. For example, the first tether 38 could be embodied as a single length of chain or cable connected at a first end to the frame 24 and connected or connectable at a second end to the door 12.

As shown, a sprocket 40 having teeth 42 is disposed within the first jamb 30 and is rotatably connected thereto proximate the first end thereof. The second section 38B of the first tether 38 is engaged with the teeth 42 of the sprocket 40. An axle 44 extends from the center of the sprocket 40 and is engaged with a shaft of a motor 46 or other prime mover. The motor 46 is operable to selectively rotate the sprocket 40 in a first direction and a second direction opposite the first direction.

The third section 38C of the first tether 38 loops around first and second rollers 48, 50 and exits the first jamb 30 through an opening defined thereby. The second end of the first tether 38 is connected or connectable to the door 12.

A second door actuation system the same as or substantially similar to the door actuation system 26 may be provided in connection with the second jamb 32.

Figure 6:
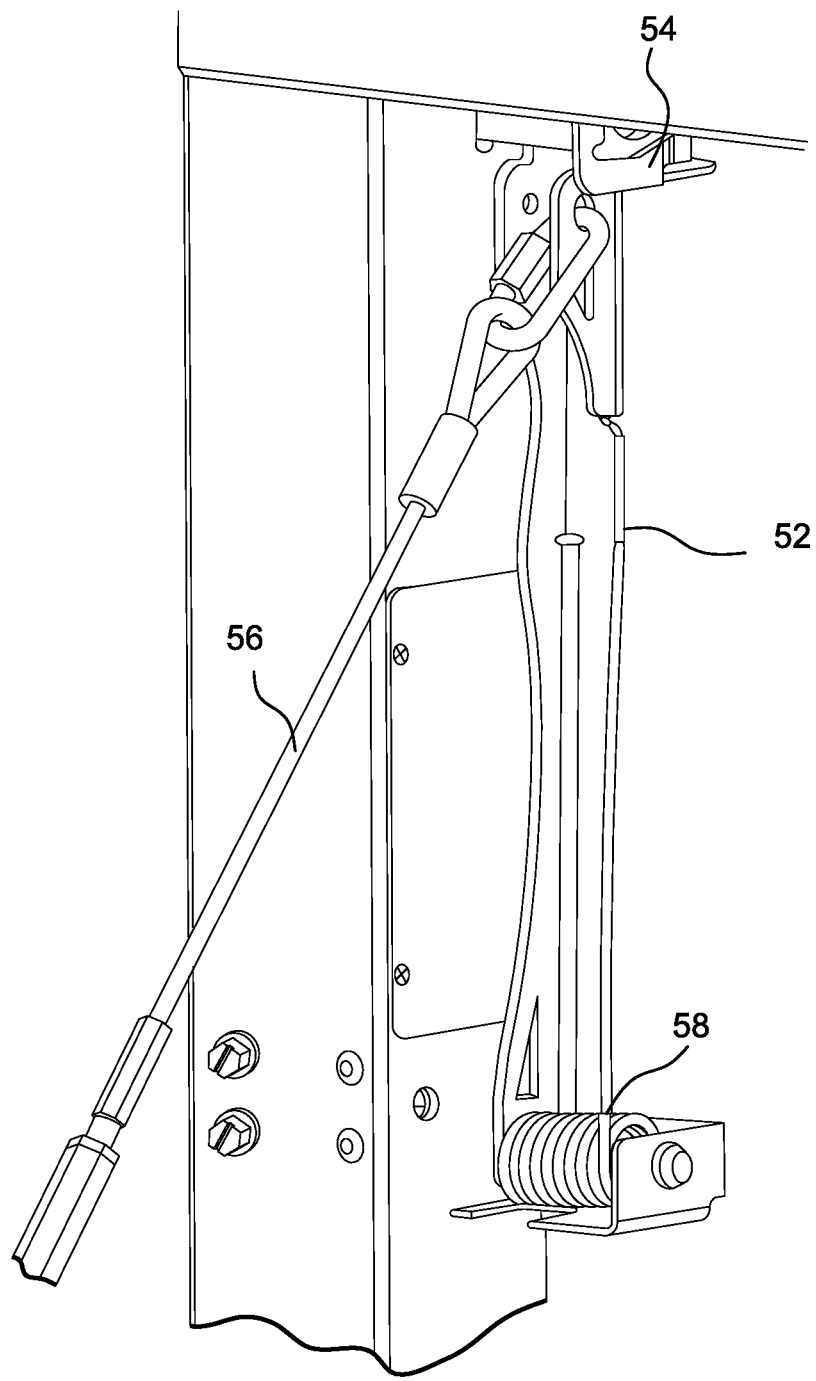
FIG. 6 is a perspective detail view of a portion of the ramp door operating mechanism as shown in FIG. 3.
Figure 7:
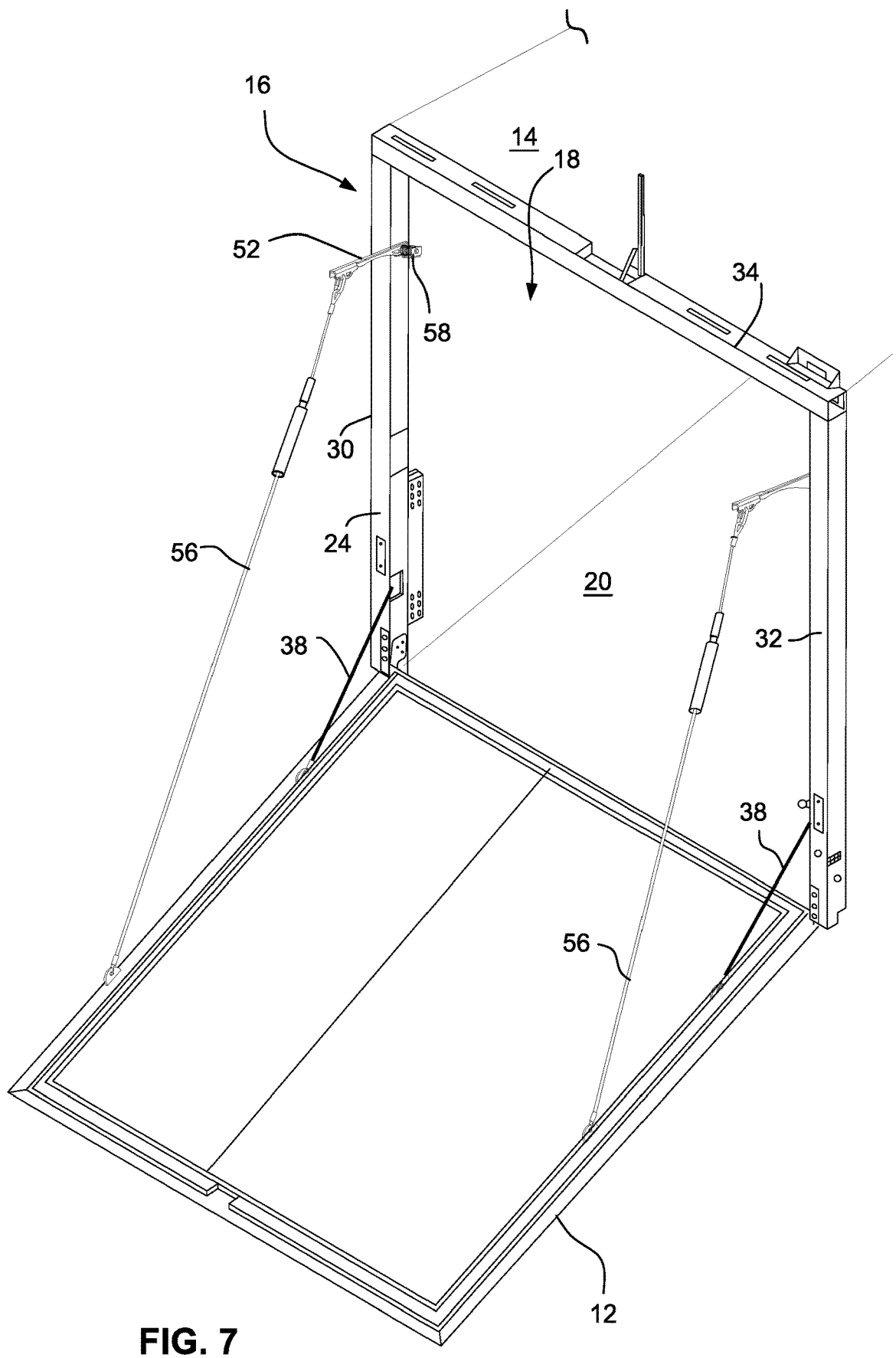
FIG. 7 is a perspective view of a ramp door and ramp door operating mechanism of FIG. 1 with the ramp door in a ramp configuration.
Figure 8:
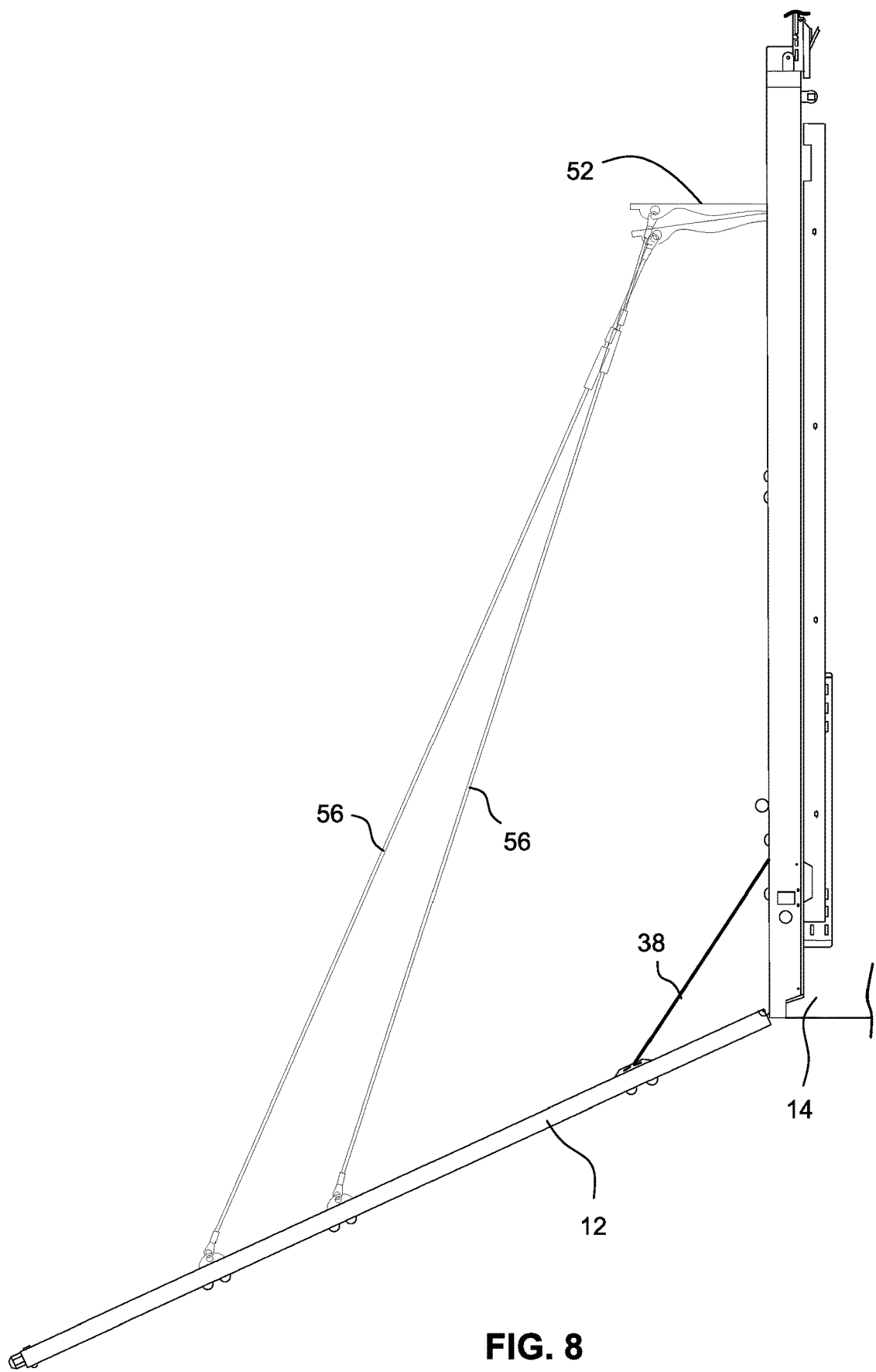
FIG. 8 is a side view of the ramp door and ramp door operating mechanism as shown in FIG. 7.
Figure 9:
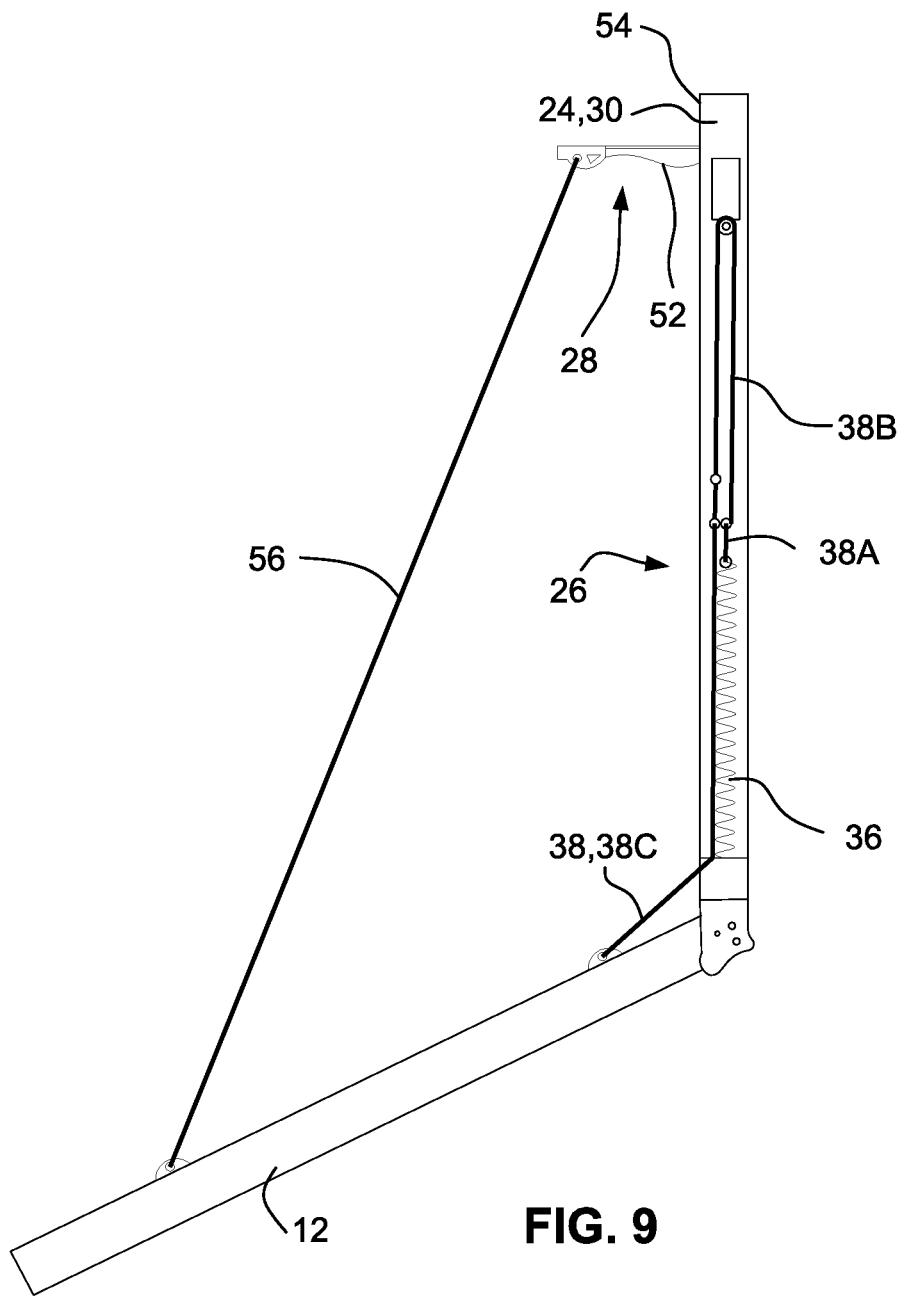
FIG. 9 is a side cross-sectional view of the ramp door operating mechanism as shown in FIG. 7.
Figure 10:
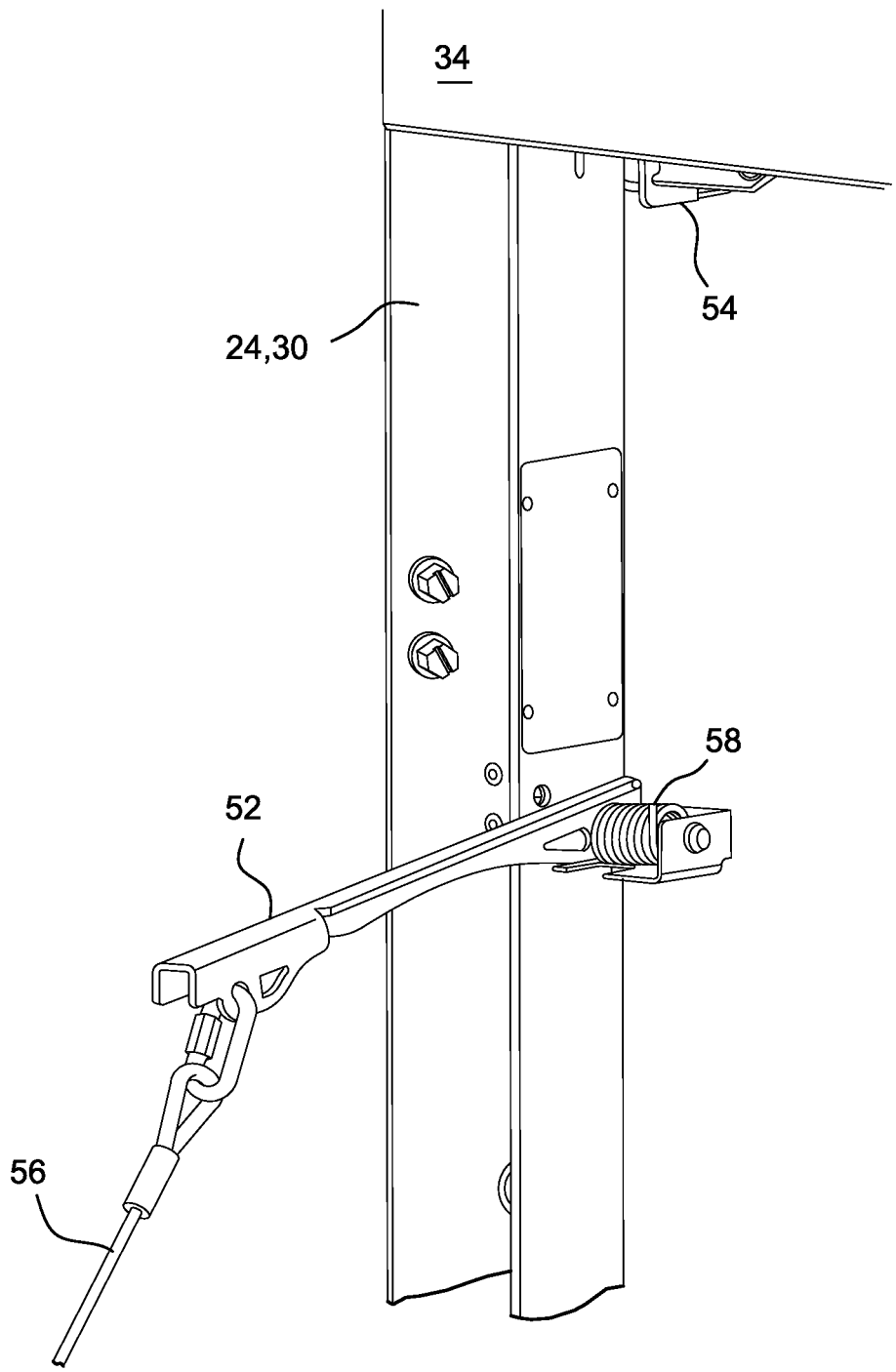
FIG. 10 is a detailed perspective view of a portion of the ramp door operating mechanism as shown in FIG. 7.
Figure 11:
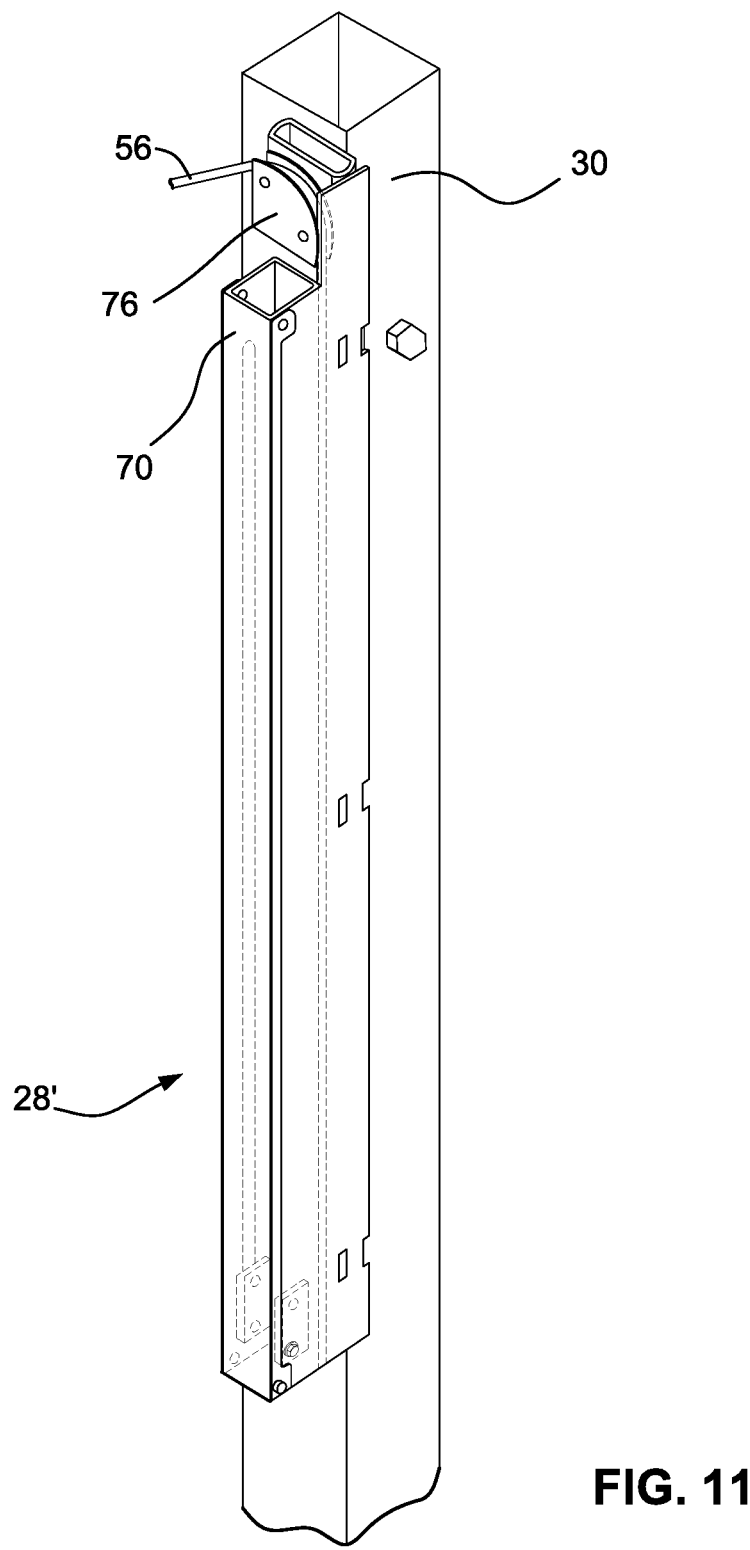
FIG. 11 is a perspective view of a portion of an alternative ramp door operating mechanism according to the present disclosure.
Figure 12:
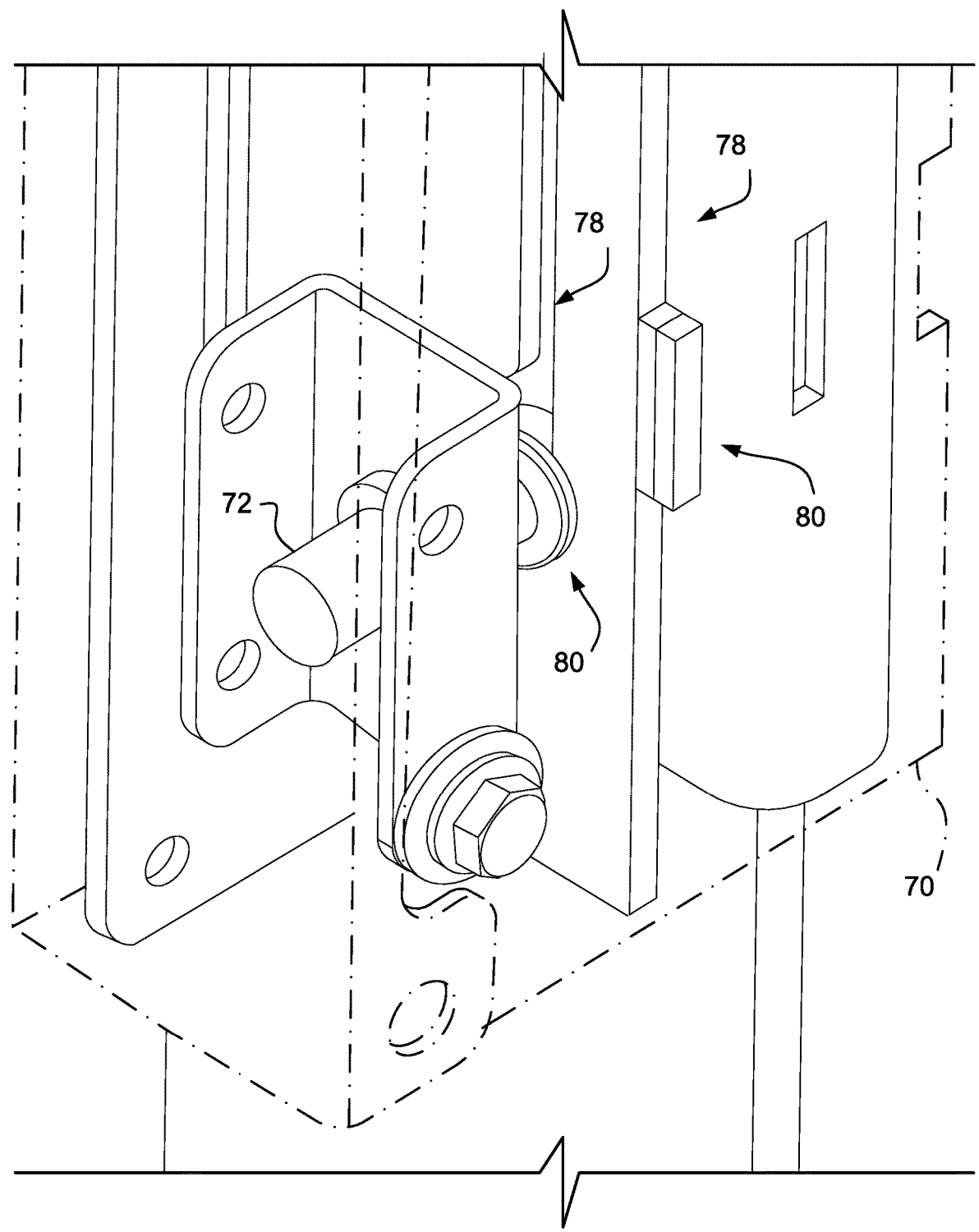
FIG. 12 is a detailed perspective view of a portion of an alternative ramp door operating mechanism according to the present disclosure.
Figure 13:
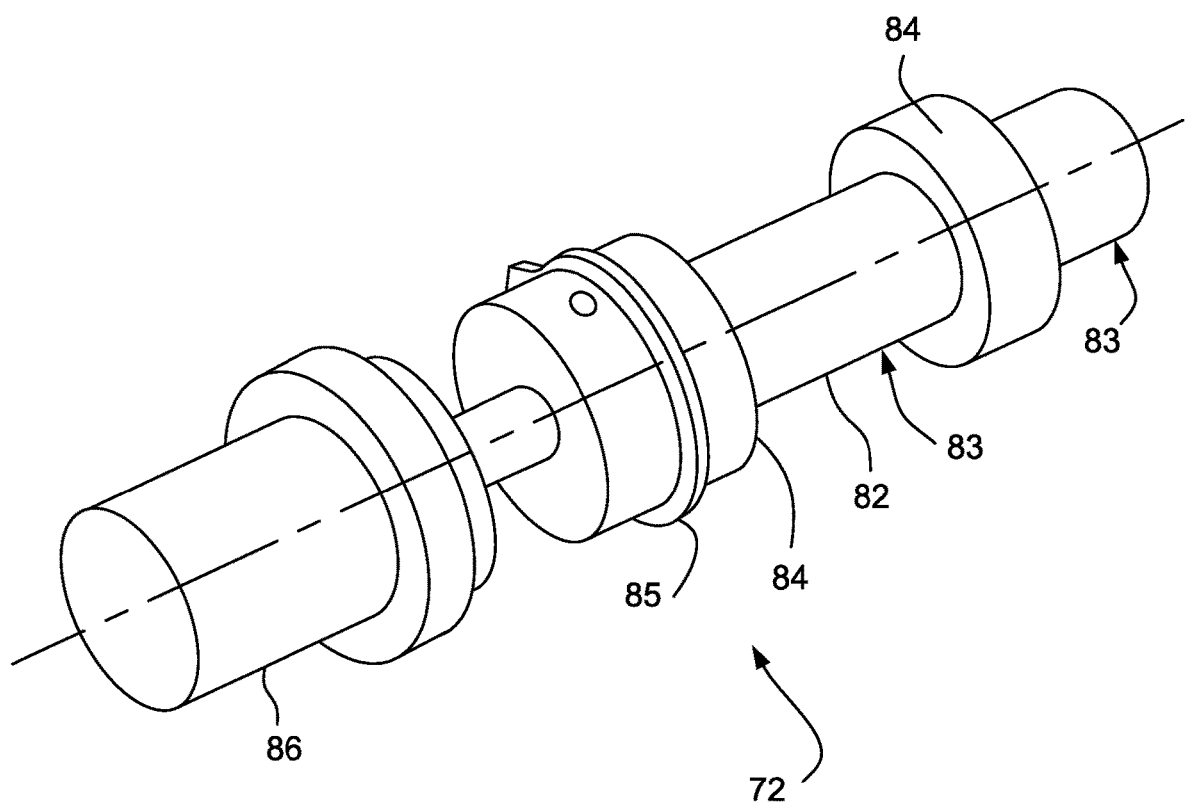
FIG. 13 is a detailed perspective view of a portion of an alternative ramp door operating mechanism according to the present disclosure.

In the illustrated embodiment, the door limit stop system 28 includes a cam 52, a latch 54, and a second tether 56 (see FIG. 6). As shown, the cam 52 may be embodied as a lever having a first end and a second end, the lever being pivotally connected proximate a first end thereof to the first jamb 30 proximate but spaced from the first end of the first jamb.

The latch 54 may be connected to the first jamb 30 or to the header 34. The latch 54 is operable to selectively lock the cam 52 in a first (or deck) position (as shown in FIGS. 3-6) and to selectively release the cam from the first position, thereby enabling the cam to rotate to a second (or ramp) position (as shown in FIGS. 7-10). A second biasing member 58, such as a coil spring, may be provided in connection with the cam 52 and configured to bias the cam to the first position.

As shown, the latch 54 may be configured to selectively engage and retain a second (or free) end of the lever 52. The latch 54 may be electrically operated. For example, the latch 54 may be configured to normally lock the cam 52 in the deck position, and may be electrically operated, for example, using a solenoid, to selectively release the cam from the deck position, thereby allowing the cam to rotate to the ramp position, as will be discussed further below. Also, the latch 54 may be configured to receive the cam 52 from the ramp position to the deck position even when the latch is in a locking position.

The second tether 56 may be embodied as a cable or other flexible element having a first end connected to the cam 52 and a second end connected to the door 12.

The door stop limit system 28 is configured to selectively limit the travel of the door 12 between the first position and the second position or the third position and to selectively provide support for the door when the door is in the second position or the third position. More specifically, the second door support system 28 is configured so that the second tether 56 limits the travel of the door 12 between the first door position and the second door position when the cam 52 is in the first cam position, and so that the second tether 56 limits the travel of the door between the first door position and the third door position when the cam 52 is in the second cam position. Also, the second tether 56 may provide support for the door 12 when the door is in the second position. In an embodiment, the second tether 56 could be configured to provide support for the door in the third position. (Typically, the free end of the door 12 would be in contact with the ground, either directly or through an intervening block or other structure, when the door is in the third position. In the event, however, that the free end of the door 12 is not in contact with the ground, either directly or through an intervening block or other structure, when in the third position, the second tether 56 could provide support for the door when the door is in the third position.)

The relationship between the pivot axis of the cam 52 and the point of attachment of the second tether 56 to the cam determine the extent to which the door 12 may pivot between the second position and the third position in response to pivoting of the cam 52.

A control circuit (not shown) may be provided for operating the mechanism 10. The control circuit may be configured to operate the motor 46 in the first direction or the second direction and to lock and unlock the latch 54 (or the locking mechanism of the alternative embodiment). The latch 54 may normally be in a locked condition. A solenoid mechanism or other means may be provided to selectively unlock the latch 54. In an embodiment, the latch 54 could be manually operated.

With the door 12 initially in the closed position and the latch 54 in the locked condition, the motor 46 may be operated in the first direction to drive the first tether 38 in a corresponding first direction, thereby tensioning the first biasing member 36 and allowing the door 12 to pivot from the closed position toward the deck position. Once the door 12 reaches the deck position, the second tether 56 becomes tensioned and precludes further pivoting of the door. The control circuit may be configured to stop the motor 46 once the door 12 reaches the deck position.

With the door 12 initially in the deck position and the latch 54 in either the locked or unlocked position, the motor 46 may be operated in the second direction to drive the first tether 38 in a corresponding second direction, thereby causing the door to pivot from the ramp position toward and to the closed position. The residual tension in the first biasing member 36 may assist such pivoting.

With the door 12 initially in the closed position and the latch 54 in the unlocked condition, the motor 46 may be operated in the first direction to drive the first tether 38 in a corresponding first direction, thereby tensioning the first biasing member 36 and allowing the door 12 to pivot from the closed position toward the ramp position. Once the door reaches the deck position, the second tether 56 becomes tensioned. Because the latch 54 is unlocked, however, the tensioned second tether 56 tensions the cam 52 and causes the cam to rotate against the biasing force imparted thereto by the second biasing member 58 from the latched position (as shown, for example, in FIG. 6) toward and to the unlatched position (as shown, for example, in FIG. 10). The control circuit may be configured to stop the motor 46 once the door reaches the ramp position.

With the door 12 initially in the ramp position and the latch 54 in either the locked condition or unlocked condition, the motor 46 may be operated in the second direction to drive the first tether 38 in a corresponding second direction, thereby causing the door 12 to pivot from the ramp position toward and to the closed position. The residual tension in the first biasing member 36 may assist such pivoting. As the door 12 pivots from the ramp position toward the deck position, the second biasing member 58 biases the cam 52 from the unlatched position to the latched position. With the latch 54 in the locked condition, the latch automatically receives and secures the cam in the latched position. The latch 54 may be placed in the unlocked condition as the cam 52 rotates to the latched position, and the cam 52 may be placed in the locked condition once the cam 52 has rotated to the latched position.

In an embodiment, the frame 24 could be omitted and the components described herein as connected to the frame could instead be connected to the structure 14 directly or through one or more intervening components.

In an embodiment, an alternative door stop limit system 28' could be provided in place of the door stop limit system 28. The alternative door stop limit system 28' omits the cam 52 and the latch 54 and includes instead a track 70 associated with the jamb 30, the track having a first (or upper) end and a second (or lower) end, a slider 72 in selective sliding engagement with the track and connected to the first end of the second tether, a slider biasing mechanism 74 configured to bias the slider toward or to the lower end of the track, and a pulley or cable guide 76 connected to upper part of the jamb 30 and supporting and guiding the second tether 56. As best shown in FIGS. 14 and 15, the slider biasing mechanism 74 may be embodied as a coil spring.

The track 70 may be connected to an exterior surface of the jamb 30 or disposed within the jamb. The track 70 defines first and second slots 78 configured to receive ends of the slider 72 in selective sliding engagement as will become evident from the discussion below. A keyway 80 is disposed at or about a first (or lower) end of each of the first and second slots 78.

As shown, the slider 72 may be embodied as a cylindrical shaft defining sliding faces 83 configured to selectively slide within the slots 78 of the track 70. The slider 72 may include first and second locking collars 84 configured to selectively engage with the keyways 80. With the locking collars 84 engaged with the keyways 80, the slider 72 is precluded from sliding within the slots 78. That is, the locking collars 84 fit into the keyways 80, but are of too large a circumference to fit into the slots 78 (which are contiguous with the keyways 80). A limit stop 85 may be provided in connection with either or both of the locking collars 84 to limit the longitudinal travel of the slider 72 through the keyways 80. The limit stop 85 may be embodied as a ring configured to engage with a corresponding circumferential groove in one of the locking collars 84 or another portion of the slider 72.

A solenoid actuator 86 may be associated with the slider 72 and configured to selectively slide the slider 72 longitudinally through the keyways 80 to thereby selectively engage the locking collars 84 with the keyways 80. The solenoid actuator 86 may be controlled by the control circuit in a manner similar to that in which the control circuit controls the latch of the limit stop system 28.

In use, with the locking collars 84 engaged with the keyways 80, the slider 72 is precluded from sliding within the slots 78 of the track 70. In this configuration, the second tether 56 limits the pivoting of the door 12 to a range between the first (closed) position and the second (deck) position. In order to allow the door to pivot to the third position, the solenoid actuator 86 may be actuated to withdraw the locking collars 84 from the keyways 80, thereby permitting the slider 72 to slide within the slots 78. In this configuration, the door 12 may be pivoted between the first (closed) position and the third (ramp) position. As the door 12 pivots between the second position, the second tether 56 moves the slider 72 in a direction away from the lower end of the track 70 toward the upper end of the track, against the biasing force provided by the slider biasing mechanism 74. As best shown in FIGS. 14 and 15, in an embodiment wherein the slider biasing mechanism 74 is a coil spring, the spring may be compressed as the slider 72 moves away from the lower end of the track 70 toward the upper end of the track.

When the door 12 is moved from the third position toward the first position, the slider biasing mechanism 74 draws the slider toward the lower end of the track 70. As best shown in FIGS. 14 and 15, in an embodiment where the slider biasing mechanism 74 is a coil spring, the spring may be decompressed to move the slider 72 toward the lower end of the track 70 from the upper end of the track. Once the slider biasing mechanism has drawn the slider 72 to the keyways 80 (which typically would occur when the door 12 is in the second position), the solenoid actuator 86 may be actuated to engage the locking collars 84 with the keyways, thereby precluding pivoting of the door 12 between the second position and the third position.

In an embodiment, the alternative door stop limit system 28' could be associated with the header 34 of the frame 24 instead of the jamb 30.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ramp door operating mechanism for displacing a ramp door among a closed position, a deck position, and a ramp position, the ramp door operating mechanism comprising:
a door actuation system connectable between a ramp door and a structure, the door actuation system including a motorized sprocket and a first tether attachable to the ramp door and engaging the motorized sprocket; and
a door limit stop system connectable between the ramp door and the structure, the door limit stop system including a second tether connectable at a proximal end to the structure and at a distal end to the ramp door, the second tether being displaceable between a first position with an effective length to support the ramp door in the deck position and a second position with an effective length to support the ramp door in the ramp position, the door limit stop system further comprising a tether extender that is configured to lock the second tether in the first position and to selectively release the second tether for displacement to the second position.

2. A ramp door operating mechanism according to claim 1, wherein the tether extender comprises:
a lever pivotally connectable to the structure and displaceable between a retracted position and an extended position, corresponding to the first position and the second position of the second tether, respectively, wherein the proximal end of the second tether is fixed to a distal end of the lever; and
a latch connectable to the structure, wherein the lever is selectively lockable in the retracted position by the latch.

3. A ramp door operating mechanism according to claim 2, wherein the tether extender further comprises a biasing member acting on the lever, the biasing member being configured to urge the lever toward the retracted position.

4. A ramp door operating mechanism according to claim 3, wherein the biasing member comprises a coil spring.

5. A ramp door operating mechanism according to claim 2, wherein the latch is electrically operated.

6. A ramp door operating mechanism according to claim 2, wherein the latch is configured to automatically lock the lever in the retracted position when the lever is displaced from the extended position to the retracted position.

7. A ramp door operating mechanism according to claim 1, wherein the tether extender comprises a lever pivotally connectable to the structure, wherein the proximal end of the second tether is secured to the lever.

8. A ramp door operating mechanism according to claim 7, wherein the lever is pivotable between a retracted position and an extended position.

9. A ramp door operating mechanism according to claim 8, wherein the tether extender further comprises a latch, and wherein the lever is selectively lockable in the retracted position by the latch.

10. A ramp door operating mechanism according to claim 1, wherein the tether extender comprises:
a track connectable to the structure; and
a slider displaceable in the track between a retracted position and an extended position, wherein the second tether is fixed to the slider, and wherein the slider is lockable in the retracted position.

11. A ramp door operating mechanism according to claim 10, wherein the tether extender further comprises a keyway adjacent the track, and wherein the slider includes a locking collar that is sized to fit through the keyway but not into the track and a sliding surface that is sized to fit into the track, the slider being displaceable laterally relative to the track between a lock position and a release position, wherein in the lock position, the locking collar is positioned in the keyway and displacement of the slider in the track is prevented, and wherein in the release position, the sliding surface is disposed in the track and the locking collar is spaced from the keyway such that displacement of the slider in the track is permitted.

12. A ramp door operating mechanism according to claim 11, wherein the slider is displaceable between the lock position and the release position by a solenoid actuator.

13. A ramp door operating mechanism according to claim 11, wherein the slider further comprises a limit stop that is positioned to limit lateral displacement of the slider.

14. A ramp door operating mechanism according to claim 11, wherein the tether extender further comprises a slider biasing mechanism acting on the slider and biasing the slider toward the retracted position.

15. A ramp door assembly for a vehicular structure, comprising:
a ramp door; and
a ramp door operating mechanism functioning between the ramp door and the vehicular structure and configured to control displacement of the ramp door among a closed position, a deck position, and a ramp position, the ramp door operating mechanism comprising:
a door actuation system connected between the ramp door and the vehicular structure, the door actuation system including a motorized sprocket and a first tether attached to the ramp door and engaging the motorized sprocket, and
a door limit stop system connected between the ramp door and the structure, the door limit stop system including a second tether connected at a proximal end to the structure and at a distal end to the ramp door, the second tether being displaceable between a first position with an effective length to support the ramp door in the deck position and a second position with an effective length to support the ramp door in the ramp position, the door limit stop system further comprising a tether extender that is configured to lock the second tether in the first position and to selectively release the second tether for displacement to the second position.

16. A ramp door assembly according to claim 15, wherein the tether extender comprises:
   a lever pivotally connected to the structure and displaceable between a retracted position and an extended position, corresponding to the first position and the second position of the second tether, respectively, wherein the proximal end of the second tether is fixed to a distal end of the lever; and
   a latch connected to the structure, wherein the lever is selectively lockable in the retracted position by the latch.

17. A ramp door assembly according to claim 15, wherein the tether extender comprises:
   a track connectable to the structure; and
   a slider displaceable in the track between a retracted position and an extended position, wherein the second tether is fixed to the slider, and wherein the slider is lockable in the retracted position.

18. A ramp door assembly according to claim 17, wherein the tether extender further comprises a keyway adjacent the track, and wherein the slider includes a locking collar that is sized to fit through the keyway but not into the track and a sliding surface that is sized to fit into the track, the slider being displaceable laterally relative to the track between a lock position and a release position, wherein in the lock position, the locking collar is positioned in the keyway and displacement of the slider in the track is prevented, and wherein in the release position, the sliding surface is disposed in the track and the locking collar is spaced from the keyway such that displacement of the slider in the track is permitted.

* * * * *